April 27, 1954

C. H. FOX 2,676,602

STREAM DIVIDER FOR PROPORTIONING THE FLOW OF LIQUIDS

Filed Oct. 28, 1952

INVENTOR.

CHARLES H. FOX

BY

ATTORNEY

Patented Apr. 27, 1954

2,676,602

UNITED STATES PATENT OFFICE 2,676,602

STREAM DIVIDER FOR PROPORTIONING THE FLOW OF LIQUIDS

Charles H. Fox, Crystal Lake, Ill., assignor to The Pure Oil Company, Chicago, Ill., a corporation of Ohio Application October 28, 1952, Serial No. 317,340

11 Claims. (Cl. 137—118)

This invention relates to an apparatus for proportioning the flow of a fluid stream. It is more specifically concerned with a reflux ratio regulator for use in distillation units for dividing the effluent from a distillation column into desired quantities of reflux and product. This application is a continuation-in-part of patent application Serial Number 130,944, filed December 3, 1949, now abandoned.

In the operation of fractional distillation columns, the effluent vapors from the column may be either partially or totally condensed. Various column head designs have been described in the prior art which may be employed to effect a partial condensation of the vapors. The liquid condensate thus produced is returned to the column as reflux. The remaining proportion of the vapor passes through a final product condenser which condenses these remaining vapors to produce a liquid product which is collected. In a distillation installation wherein a total condenser is employed, all of the vapors from the distillation column are condensed. This condensate is collected in an accumulator from whence the condensate is returned in total or in part as reflux to the column. Because a total condenser type of system requires less attention and simplifies control of the reflux, this method is generally preferred. In controlling the reflux ratio, which is more commonly denoted as the quantity of reflux per unit quantity of distillate removed from the distillation process as a product, several different distillation tower accessories have been used such as valves and flow meters in the reflux and product lines or weir boxes. It has been pointed out in the prior art that weir boxes are generally undesirable when employed as auxiliary equipment with laboratory or pilot plant distillation equipment because the flow conditions in the weir box might introduce errors which in some instances would make this type of reflux ratio regulator malfunction. A further disadvantage which is experienced in the use of a weir box proportioning device in small scale equipment is the relatively large liquid holdup in the proportioning device and the reflux line.

It is therefore an object of this invention to provide a flow proportioning device having designed features which will permit accurate proportioning of the condensate produced in a distillation column at low flow rates.

It is a further object of this invention to provide an apparatus which has structural features which overcome the disadvantages of conventional weir box type reflux proportioners.

The specific structural features for the preferred embodiment of an improved form of apparatus for controlling and/or proportioning the flow of liquids are pictorially shown in the accompanying drawing in which.

Figure 1:
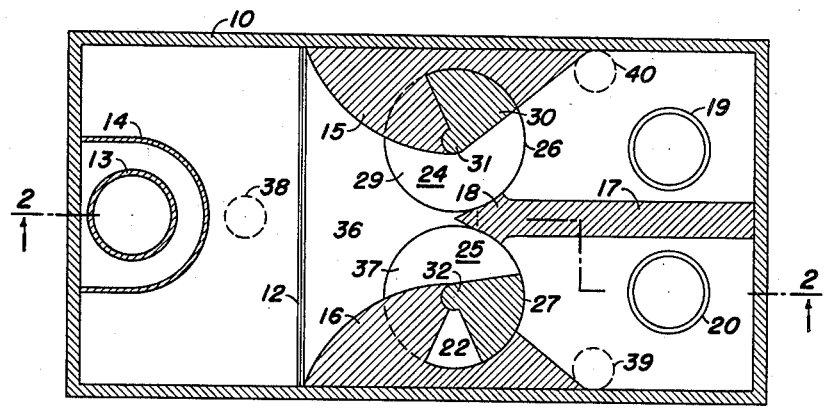
Figure 1 is a cross-sectional plan looking downward on the apparatus, the plane of the section being referred to as line 1—1.
Figure 2:
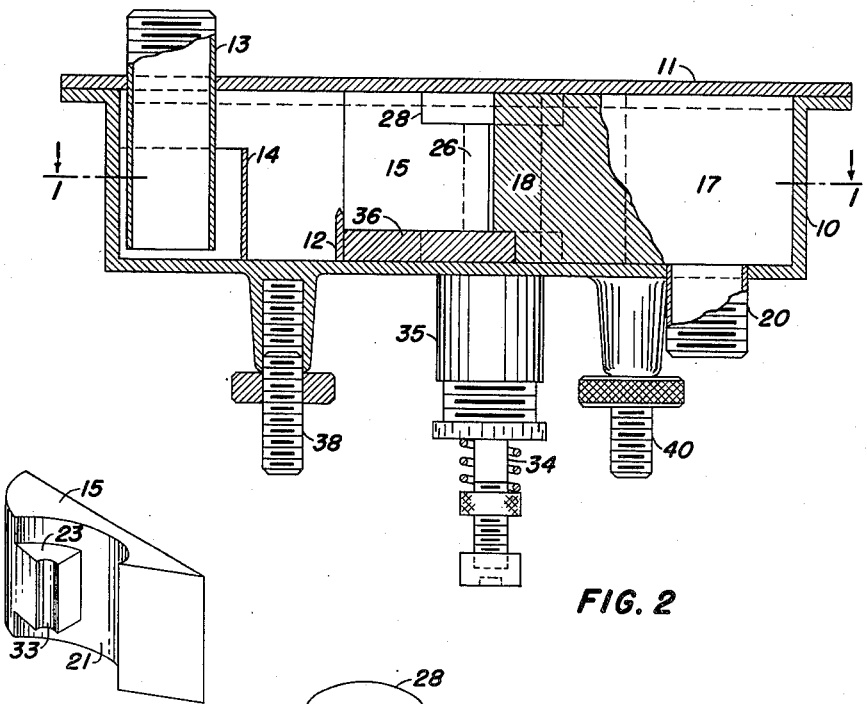
Figure 2 is a longitudinal sectional elevation, the section being taken along line 2—2.
Figure 3:
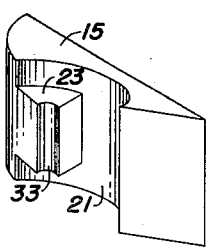
Figure 3 is an isometric view of one of the flow convergence baffles which is positioned within the flow proportioner adjacent to and downstream to the weir.
Figure 4:
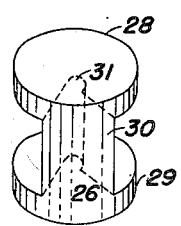
Figure 4 is an isometric view of the rotating gate type element of one of the valvate means which cooperates with the flow convergence baffle to control the passage of effluent from the proportioner.

Referring now to the drawing for a more detailed description of the apparatus, it is seen that the apparatus comprises a receptacle 10 which may or may not be enclosed. In the illustrated embodiment the receptacle 10 has a substantially rectangular, vertical and horizontal cross-section. However, the receptacle 10 may have other configurations within the scope of the invention. In the event that it is desirable to avoid inaccuracies due to air currents passing over the flowing stream which might cause the stream flow to be uneven or to prevent loss of the condensate because of accidental spillages, a suitable cover such as 11 may be used to enclose the receptacle 10. Receptacle 10 is divided into an inlet or stream calming section chamber and an outlet chamber or flow proportioning section by means of weir 12. An inlet such as 13 permits the entrance of the stream, which is to be proportioned, into the inlet chamber. In the preferred embodiment illustrated in the drawing, the inlet 13 depends downwardly into the inlet chamber sufficiently far to permit the liquid stream to enter the chamber without causing undue turbulence. Any turbulence which results from the entrance of the fluid into the inlet chamber is further minimized by a curved perforated baffle 14 which surrounds the terminal extremity of inlet pipe 13. Weir 12, which separates the inlet chamber from the outlet chamber, extends transversely across the bottom of the vessel 10 and is so positioned that the faces of the weir are perpendicular to the bottom and the walls of the vessel 10. In this instance it is to be noted that a sharp-edged weir is employed. However, the crest edge may also have a horizontal flat surface. Mounted within the outlet chamber immediately adjacent the weir 12 are the flow convergence baffles 15 and 16. These baffles have smooth-contoured leading edge walls which converge inwardly from the side walls of receptacle 10 to form a sluice or passageway which directs the flowing stream into the outlet sections of the outlet chamber. The floor of this sluice should be substantially plane to permit the turbulence-free flow of fluids. The outlet chamber is divided into separate outlet sections by means of partition 17. This partition is longitudinally mounted within the outlet chamber so that the walls of the partition are perpendicular to the bottom of receptacle 10. Partition 17 is provided with a cuneate leading section 18 having circularly arcuate walls. A stream outlet such as 19 and 20 is provided in each of the outlet sections. The flow convergence baffles 15 and 16 are formed with circularly arcuate recesses 21 and 22. The faces of each recess correspond radially with a substantial extent of the adjoining wall of the leading edge section 18 of partition 17. That is to say, the respective recess face and leading edge wall which cooperate to define the opening into the contiguous outlet section have a common axis of curvature. Bosses such as 23 are mounted within the recesses 21 and 22 immediately adjacent the leading edge of the flow convergence baffles 15 and 16, the outer faces of the bosses being an unbroken continuation of the contour of the leading edge of baffles 15 and 16. Each boss cooperates with the face of the recess in which it is mounted to form a portion of the seat for rotatable valvate means 24 and 25 having gate sections like that illustrated in Figure 4. This portion of the valve seat is complemented by the adjoining wall of the leading section 18 of partition 17 to form a valve seat which cooperates with the gate section 26 and 27 of the valvate means 24 and 25 to regulate the flow into the respective outlet sections. The gate element of each of these valvate means preferably comprises essentially a pair of spaced circular flanges such as 28 and 29 having disposed therebetween an eccentrically mounted section such as 30 which is substantially a cylindrical sector in that one face of the section is a radial plane whereas the other face instead of also being a radial plane is a plane which is angularly displaced from the radial plane and emanates tangentially from the valve axle 31 or 32. This section matches the volume of the valve seat unoccupied by the flange components of the gate element and the valve seat boss. The apex of the sector is formed into a semi-cylindrical axle 31 which is coaxial with the spaced flanges. However, by modifying the flow convergence baffle faces, the eccentrically mounted section may, if desired, take the form of a true geometric cylindrical section. The cylindrical surfaces of the gate section radially correspond to circularly arcuate faces of the recesses 21 and 22 and the walls of the leading section 18 of partition 17. These gate sections which are independently controlled are rotatably positioned within the openings to each of the outlet sections coaxial with the common axis of curvature of the aforementioned faces and walls. The semi-cylindrical axle is fitted into a cooperating semi-cylindrical recess as illustrated by 33 in boss 23. These gate sections are rotated by valve stems such as 34 which are integrally connected to the gate section and extend into the receptacle 10 through a suitable packing gland 35. The side wall of the sector, which forms the gate face contacted by the flowing stream, is substantially plane in order that it may cooperate with the leading edge of the flow convergence baffles 15 and 16 and the protuberance 23 to form a continuously contour surface which will permit an unbroken flow of fluid about it in the stream splitting area of the apparatus. Although not essential to the operation of the apparatus in all its applications, it is preferred that the floor 36 of the sluice be at the same level as the lower flange faces 29 and 37 of the gate sections in order that flow turbulence and liquid holdup within the passageway may be further minimized. Inasmuch as one of the objections to conventional proportioners of the weir box type is that the weir box during its use might become misaligned to a non-horizontal position and thus produce irregularities in stream flow over the weir, it is preferred that leveling means be provided. The type of leveling means used will, of course, depend upon the manner in which the reflux ratio controller is mounted in conjunction with the distillation tower. In the event that the flow proportioner is positioned on a platform, this leveling means may take the form of that illustrated in the drawing which consists essentially of a tripod arrangement having adjustable legs 38, 39 and 40 and locking means for assuring that the legs once positioned will remain there to maintain the apparatus in a horizontal position.

In one of its applications as a distillation tower accessory, the device is connected in series with the outlet of the total condenser and functions as a proportioning device to control the reflux ratio. In its operation the condensate would flow into the apparatus by means of inlet 13. Any turbulence in the flow of fluid would be eliminated in the inlet chamber or quieting section of the apparatus thus providing a non-turbulent feed to the weir 12. Flow would continue over the weir into the sluice between the flow convergence baffles 15 and 16. The smooth sided baffles narrow the stream of the fluid as it approaches the openings into the outlet sections. The absence of any sharp corners in this section eliminates the formation of any eddy currents. The gates 26 and 27, which have been positioned to provide a desired apportionment of the fluid flow, control the quantity of flow into the respective outlet sections with the assistance of the dividing partition 17. The faces of all of the obstructions with which the fluid stream comes in contact are smooth and regular to provide for a non-turbulent flow. It is to be understood that the foregoing embodiment may be modified to facilitate the fabrication of the device. For example, the flow convergence baffles 15 and 16 and the eccentrically mounted sections do not have to be solid and may be skeletal configurations having the necessary functional outline. Other modifications of the device which will permit the subdivision of a flowing stream into more than two branches by employing the features embodied in the illustrative example will be apparent and are considered within the purview of the instant invention.

It is thus seen that the flow proportioner thus described has incorporated in its design several novel features which permit it to be employed for accurately proportioning the flow of liquids at low rates. In the accurate division of a fluid stream it is essential that in addition to accurately subdividing the cross-section of the conduit, there must also be an absence of eddy currents. The fluid stream must be flowing forward at essentially the same speed on each side of the dividing partition. In order to effectuate this it is necessary that any turbulence in the flow of fluid be eliminated before the stream flows over the weir. In addition, the head of the fluid stream and the resulting velocity on the floor plate of the sluice must be controlled. Finally, it is necessary that the fluid stream pass through the openings into the outlet sections without producing any turbulence in the flow. These requisites are not met by the prior art devices and as a result they do not permit the accurate and reproducible division of a fluid stream flowing at a low rate which the instant device makes possible.

Therefore, I claim as my invention:

1. A stream divider for proportioning the flow of liquids comprising a receptacle having side walls, a feed inlet into said receptacle, a weir transversely disposed within said receptacle forming an inlet chamber adjacent to and surrounding the said feed inlet, and an outlet chamber, said outlet chamber containing a fixed longitudinal partition having a cuneate leading edge, said partition dividing a portion of the outlet chamber into two fluid receiving outlet sections separated from each other, the walls of said leading edge being circularly arcuate, a feed outlet located in each of said outlet sections, opposed flow convergence side baffles integral with the side walls of said outlet chamber adjacent said weir, the fluid contacting surfaces of the baffles being inwardly convergent and smoothly curved to provide for the unbroken flow of fluid about said baffles, said baffles being provided with circularly arcuate valve seat sections, the arcuate faces of each section being radially correspondent to a substantial extent of the adjacent leading edge wall of the said fixed partition, and vertically mounted, rotatable, independently controlled valvate means disposed in the openings defined by the circularly arcuate sections of said baffles and the respectively cooperating walls of the leading edge of said fixed partition, said valvate means comprising gate sections which are adapted to slidably contact the faces of the said recesses and the walls of the leading edge of the partition in fluidtight relationship and permit fluid flow free from turbulence through said openings.

2. A stream divider for proportioning the flow of liquids comprising a receptacle having side walls, a feed inlet into said receptacle, a weir transversely disposed within said receptacle forming an inlet chamber adjacent to and surrounding the said feed inlet, and an outlet chamber, said outlet chamber containing a fixed longitudinal partition having a cuneate leading section, said partition dividing the outlet chamber into outlet sections separated from each other, the walls of said leading section being circularly arcuate, a feed outlet located in each of said outlet sections, opposed flow convergence side baffles integral with the side walls of said first mentioned chamber adjacent said weir, the fluid contacting surfaces of said baffles being inwardly convergent and smoothly curved to provide for the unbroken flow of fluid about them, said baffles being provided with circularly arcuate valve seat sections radially correspondent to the adjacent leading section wall of the said fixed partition, said valve seat sections each having a boss mounted therein adjacent the leading edges of said baffles, the fluid contacting surfaces of said bosses being smoothly curved continuations of the curved leading edges of said baffles, and vertically mounted, rotatable, independently controlled valvate means disposed in the openings defined by the circularly arcuate sections of said baffles and the walls of the leading section of said fixed partition, said valvate means comprising a gate section adapted to slidably contact said walls in fluidtight relationship and comprising vertically spaced circular flanges disposed within said openings, said flanges having interposed therebetween eccentrically mounted sectors, said sectors having peripheral surfaces which conform to the outline of the respective baffle seat section unoccupied by said flanges and bosses, the fluid contacting faces of said sectors being sufficiently large to permit said faces to register with and function as closures for said openings.

3. A stream divider for proportioning the flow of liquids comprising a receptacle having side walls, a feed inlet into said receptacle, a weir transversely disposed within said receptacle forming an inlet chamber adjacent to and surrounding the said feed inlet, and an outlet chamber, said outlet chamber containing a fixed longitudinal partition having a cuneate leading section, said partition dividing the outlet chamber into outlet sections separated from each other, the walls of said leading section being circularly arcuate, a feed outlet located in each of said outlet sections, opposed flow convergence side baffles integral with the side walls of said first mentioned chamber adjacent said weir, the fluid contacting surfaces of said baffles being inwardly convergent and smoothly curved to provide for the unbroken flow of fluid about them, said baffles being provided with circularly arcuate valve seat sections radially correspondent to the adjacent leading section wall of the said fixed partition, said valve seat sections each having a boss mounted therein adjacent the leading edges of said baffles, the fluid contacting surfaces of said bosses being smoothly curved continuations of the curved leading edges of said baffles, and vertically mounted, rotatable, independently controlled valvate means disposed in the openings defined by the circularly arcuate sections of said baffles and the walls of the leading section of said fixed partition, said valvate means comprising a gate section adapted to slidably contact said walls in fluid tight relationship and comprising vertically spaced circular flanges disposed within said openings, said flanges having interposed therebetween eccentrically mounted solid sectors, said sectors having configurations which conform to the volumes of the respective baffle seat section unoccupied by said flanges and bosses, the fluid contacting faces of said sectors being sufficiently large to permit said faces to register with and function as closures for said openings.

4. A stream divider for proportioning the flow of liquids comprising a receptacle having side walls, a feed inlet into said receptacle, a baffle surrounding said feed inlet, a weir transversely disposed within said receptacle forming an inlet chamber adjacent to and surrounding the said feed inlet, and an outlet chamber, said outlet chamber containing a fixed longitudinal partition having a cuneate leading edge, said partition dividing a portion of the outlet chamber into two fluid receiving outlet sections separated from each other, the walls of said leading edge being circularly arcuate, a feed outlet located in each of said outlet sections, opposed flow convergence side baffles integral with the side walls of said outlet chamber adjacent said weir, the fluid contacting surfaces of the baffles being inwardly convergent and smoothly curved to provide for the unbroken flow of fluid about said baffles, said baffles being provided with circularly arcuate valve seat sections, the arcuate faces of each section being radially correspondent to a substantial extent of the adjacent leading edge wall of the said fixed partition, and vertically mounted, rotatable, independently controlled valvate means disposed in the openings defined by the circularly arcuate sections of said baffles and the respectively cooperating walls of the leading edge of said fixed partition, said valvate means comprising gate sections which are adapted to slidably contact the faces of the said recesses and the walls of the leading edge of the partition in fluidtight relationship and permit fluid flow free from turbulence through said openings.

5. A stream divider for proportioning the flow of liquids comprising a receptacle having side walls, a feed inlet into said receptacle, a baffle surrounding said feed inlet, a weir transversely disposed within said receptacle forming an inlet chamber adjacent to and surrounding the said feed inlet, and an outlet chamber, said outlet chamber containing a fixed longitudinal partition having a cuneate leading section, said partition dividing the outlet chamber into outlet sections separated from each other, the walls of said leading section being circularly arcuate, a feed outlet located in each of said outlet sections, opposed flow convergence side baffles integral with the side walls of said first mentioned chamber adjacent said weir, the fluid contacting surfaces of said baffles being inwardly convergent and smoothly curved to provide for the unbroken flow of fluid about them, said baffles being provided with circularly arcuate valve seat sections radially correspondent to the adjacent leading section wall of the said fixed partition, said valve seat sections each having a boss mounted therein adjacent the leading edges of said baffles, the fluid contacting surfaces of said bosses being smoothly curved continuations of the curved leading edges of said baffles, and vertically mounted, rotatable, independently controlled valvate means disposed in the openings defined by the circularly arcuate sections of said baffles and the walls of the leading section of said fixed partition, said valvate means comprising a gate section adapted to slidably contact said walls in fluid tight relationship and comprising vertically spaced circular flanges disposed within said openings, said flanges having interposed therebetween eccentrically mounted sectors, said sectors having peripheral surfaces which conform to the outline of the respective baffle seat section unoccupied by said flanges and bosses, the fluid contacting faces of said sectors being sufficiently large to permit said faces to register with and function as closures for said openings.

6. A stream divider for proportioning the flow of liquids comprising a receptacle having side walls, a feed inlet into said receptacle, a baffle surrounding said feed inlet, a weir transversely disposed within said receptacle forming an inlet chamber adjacent to and surrounding the said feed inlet, and an outlet chamber, said outlet chamber containing a fixed longitudinal partition having a cuneate leading section, said partition dividing the outlet chamber into outlet sections separated from each other, the walls of said leading section being circularly arcuate, a feed outlet located in each of said outlet sections, opposed flow convergence side baffles integral with the side walls of said first mentioned chamber adjacent said weir, the fluid contacting surfaces of said baffles being inwardly convergent and smoothly curved to provide for the unbroken flow of fluid about them, said baffles being provided with circularly arcuate valve seat sections radially correspondent to the adjacent leading section wall of the said fixed partition, said valve seat sections each having a boss mounted therein adjacent the leading edges of said baffles, the fluid contacting surfaces of said bosses being smoothly curved continuations of the curved leading edges of said baffles, and vertically mounted, rotatable, independently controlled valvate means disposed in the openings defined by the circularly arcuate sections of said baffles and the walls of the leading section of said fixed partition, said valvate means comprising a gate section adapted to slidably contact said walls in fluidtight relationship and comprising vertically spaced circular flanges disposed within said openings, said flanges having interposed therebetween eccentrically mounted solid sectors, said sectors having configurations which conform to the volumes of the respective baffle seat section unoccupied by said flanges and bosses, the fluid contacting faces of said sectors being sufficiently large to permit said faces to register with and function as closures for said openings.

7. An apparatus in accordance with claim 6 in which the baffle surrounding the feed inlet is perforated.

8. A stream divider for proportioning the flow of liquids comprising a receptacle having side walls, a feed inlet into said receptacle, a perforated baffle surrounding said feed inlet, a weir transversely disposed within said receptacle forming an inlet chamber adjacent to and surrounding the said feed inlet, and an outlet chamber, said outlet chamber having a substantially plane floor and containing a fixed longitudinal partition having a cuneate leading section, a partition dividing the outlet chamber into outlet sections separated from each other, the walls of said leading section being circularly arcuate, a feed outlet located in each of said outlet sections, opposed flow convergence side baffles integral with the side walls of said first mentioned chamber adjacent said weir, the fluid contacting surfaces of said baffles being inwardly convergent and smoothly curved to provide for the unbroken flow of fluid about them, said baffles being provided with circularly arcuate valve seat sections radially correspondent to the adjacent leading section wall of the said fixed partition, said valve seat sectoins each having a boss mounted therein adjacent the leading edges of said baffles, the fluid contacting surfaces of said bosses being smoothly curved continuations of the curved leading edges of said baffles, and vertically mounted, rotatable, independently controlled valvate means disposed in the openings defined by the circularly arcuate sections of said baffles and the walls of the leading section of said fixed partition, said valvate means comprising a gate section adapted to slidably contact said walls in fluidtight relationship and comprising vertically spaced circular flanges disposed within said openings, said flanges having interposed therebetween eccentrically mounted solid sectors, said sectors having configurations which conform to the volumes of the respective baffle seat section unoccupied by said flanges and bosses, the fluid contacting faces of said sectors being sufficiently large to permit said faces to register with and function as closures for said openings.

9. A stream divider for proportioning the flow of liquids comprising a receptacle having side walls, a feed inlet into said receptacle, a weir transversely disposed within said receptacle forming a stream calming chamber adjacent to and surrounding the said feed inlet, and a stream proportioning chamber, said stream proportioning chamber comprising a fixed partition having a cuneate leading edge, said partition dividing the stream proportioning chamber into two fluid receiving sections separated from each other, the walls of said leading edge being circularly arcuate, a feed outlet located in each of said fluid receiving sections, opposed flow convergence-side baffles integral with the side-walls of said first mentioned chamber adjacent said weir, said baffles being provided with circularly arcuate valve seat sections being radially correspondent to the adjacent leading edge wall of the said fixed partition, and vertically mounted, rotatable, independently controlled valvate means disposed in the openings defined by the circularly arcuate sections of said baffles and the walls of the leading edge of said fixed partition, said valvate means being adapted to slidably contact said walls in fluidtight relationship.

10. A stream divider for proportioning the flow of liquids comprising a receptacle having sidewalls, a feed inlet into said receptacle, a weir transversely disposed within said receptacle forming a stream calming chamber adjacent to and surrounding the said feed inlet, and a stream proportioning chamber, said stream proportioning chamber comprising a fixed partition having a cuneate leading edge, said partition dividing the stream proportioning chamber into two fluid receiving sections separated from each other, the walls of said leading edge being circularly arcuate, a feed outlet located in each of said fluid receiving sections, opposed flow convergence-side baffles integral with the side-walls of said first mentioned chamber adjacent said weir, said baffles being provided with circularly arcuate valve seat sections radially correspondent to the adjacent leading edge wall of the said fixed partition, and vertically mounted, rotatable, independently controlled valvate means disposed in the openings defined by the circularly arcuate sections of said baffles and the walls of the leading edge of said fixed partition, said valvate means being adapted to slidably contact said walls in fluidtight relationship and comprising vertically spaced circular flanges disposed within said openings, said flanges having diametrically interposed therebetween an intermediate gate section having circularly arcuate walls which are substantially rectangular in vertical cross-section.

11. A stream divider for proportioning the flow of liquids comprising a receptacle having sidewalls, a feed inlet into said receptacle, a baffle surrounding said feed inlet, a weir being shorter in height than said baffle transversely disposed within said receptacle a stream calming chamber adjacent to and surrounding the said feed inlet, and a stream proportioning chamber, said stream proportioning chamber comprising a fixed partition having a cuneate leading edge, said partition dividing the stream proportioning chamber into two fluid receiving sections separated from each other, the walls of said leading edge being circularly arcuate, a feed outlet located in each of said fluid receiving sections, opposed flow convergence-side baffle integral with the side-walls of said first mentioned chamber adjacent said weir, said baffles being provided with circularly arcuate valve seat sections radially correspondent to the adjacent leading edge wall of the said fixed partition, and vertically mounted, rotatable, independently controlled valvate means disposed in the openings defined by the circularly arcuate sections of said baffles and the walls of the leading edge of said fixed partition, said valvate means being adapted to slidably contact said walls in fluidtight relationship and comprising vertically spaced circular flanges disposed within said openings, said flanges having diametrically interposed therebetween an intermediate gate section having circularly arcuate walls which are substantially rectangular in vertical cross-setcion.

References Cited in the file of this patent

UNITED STATES PATENTS

| Number | Name | Date |
|---|---|---|
| 1,673,373 | Peters, Jr. | June 12, 1928 |
| 2,163,591 | Deverall | June 27, 1939 |